(12) United States Patent
Hsiang

(10) Patent No.: US 11,322,937 B2
(45) Date of Patent: May 3, 2022

(54) POWER SUPPLY DEVICE WITH IMPROVED CURRENT BALANCING MECHANISM

(71) Applicant: ACBEL POLYTECH INC., New Taipei (TW)

(72) Inventor: Chia-Chih Hsiang, New Taipei (TW)

(73) Assignee: Acbel Polytech Inc., New Taipei (TW)

( * ) Notice: Subject to any disclaimer, the term of this patent is extended or adjusted under 35 U.S.C. 154(b) by 68 days.

(21) Appl. No.: 17/018,172

(22) Filed: Sep. 11, 2020

(65) Prior Publication Data

US 2021/0399625 A1  Dec. 23, 2021

(30) Foreign Application Priority Data

Jun. 18, 2020 (TW) ................................. 109120556

(51) Int. Cl.
*H02J 1/10* (2006.01)
*H02M 3/158* (2006.01)

(52) U.S. Cl.
CPC ........... *H02J 1/102* (2013.01); *H02M 3/1584* (2013.01)

(58) Field of Classification Search
CPC ..... H02J 1/102; H02M 3/1584; H02M 3/1586
See application file for complete search history.

(56) References Cited

U.S. PATENT DOCUMENTS

| | | | | |
|---|---|---|---|---|
| 5,036,452 A * | 7/1991 | Loftus | ..................... | H02J 1/102 363/71 |
| 6,137,274 A * | 10/2000 | Rajagopalan | ........... | H02J 1/102 323/272 |
| 8,072,200 B1 * | 12/2011 | Qiu | ..................... | H02M 3/1584 323/282 |
| 2007/0024263 A1 * | 2/2007 | Yang | ....................... | G05F 1/575 323/315 |
| 2009/0039704 A1 * | 2/2009 | Chen | ....................... | H02J 1/102 307/52 |
| 2013/0154595 A1 * | 6/2013 | Drinovsky | ............ | H02M 3/156 323/282 |
| 2014/0097818 A1 * | 4/2014 | Wiktor | .................. | H02M 3/156 323/283 |
| 2015/0076910 A1 * | 3/2015 | Wang | ........................ | H02J 1/10 307/52 |
| 2019/0129456 A1 * | 5/2019 | Hsu | ....................... | H02M 3/156 |
| 2019/0149048 A1 * | 5/2019 | Takegami | ............. | H02M 3/157 323/282 |
| 2020/0169170 A1 * | 5/2020 | Zhang | ................... | H02M 3/158 |
| 2020/0343723 A1 * | 10/2020 | Li | ....................... | H02M 3/1584 |

* cited by examiner

*Primary Examiner* — Fred E Finch, III
(74) *Attorney, Agent, or Firm* — Rosenberg, Klein & Lee

(57) ABSTRACT

A power supply device with improved current balancing mechanism includes a power supply module, and a current detecting module detecting the output current to generate a sample voltage. A compensation voltage is provided that is in superposition with the sample voltage to synthesizes a corrected sample voltage, and a current mirror unit receives the corrected sample voltage at a first end. A positive input end of a comparator unit is connected to a second end of the current mirror unit, and is connected to the first end through a voltage divider, while the comparator unit outputs the current share voltage under negative feedback control. The current share output is corrected by compensating the sampling voltage and reflecting it by a current mirror with a certain ratio, the inconvenience of manually adjusting variable resistor, or the problem of temperature influenced BJT and MOSFET, or phase delay of digital sampling is solved.

7 Claims, 6 Drawing Sheets

POWER SUPPLY DEVICE WITH IMPROVED CURRENT BALANCING MECHANISM

BACKGROUND OF THE INVENTION

1. Field of the Invention

The present invention relates to a power supply device, and more particularly to a power supply device with an improved current balancing mechanism.

2. Description of the Related Art

Most of redundant power supply systems designed for high end server systems require a stable current balanced output. That is, each power supply unit in the power supply system should output same amount of current to provide the load with enough power as one power supply module.

With reference to FIG. 6, the Automatic Master Method is one of the commonly used current balancing mechanisms. In a redundant power supply system implementing the Automatic Master Method, the system includes the power supply devices 60, a current share bus 71, and a load output port 72. Each power supply device 60 includes a power supply module 62 to generate output current which is connected to a power output end Vo of each power supply device 60, wherein the power output end Vo is connected to the load output port 72 to provide power. Each power supply device 60 in the system has a current share output end VLSI that is connected to the current share bus 71 to provide an output current information that relates to its own output current. Each power supply device 60 also receives the output current information from the current share bus 71 that represents the largest output current. Each power supply device 60 compares the output current information that represents the largest output current to its own output current information, and decides whether to adjust the output current according to the comparison result.

The current share information in each power supply device 60 is provided by a current detecting unit 61. The current detecting unit 61 samples the output current of the power supply device 60, generating an initial sampling voltage accordingly. The initial sampling voltage is then amplified by an amplifier according to a certain ratio. However, there is error in each state of the process of current sampling and amplifying. For example, the current sampling resistor in the current detecting unit 61 usually has an error of 0.5%~1% because of the low resistance character. The amplifier has a 75 uV~1000 uV input offset, and with an amplifying rate of 481. Therefore, the output error is about 63 mV~481 mV. With the above mentioned error, the output current information may have an error up to 6.9%. The error of the output current information directly influences the current balancing between the power supply device 60s, and therefore limits the maximum output power that can be requested from the power supply system.

There are some solutions implemented presently to correct the error in current sharing information: 1. Adding a variable resistor in the amplifier unit, so that the amplifying rate can be adjusted manually. The disadvantage is the cost of manual adjustment and the reliability of the variable resistor. 2. Adding a BJT or MOSFET as a variable resistor in the amplifier unit. Though no manual adjustment is required in this solution, the character of a BJT or MOSFET is subject to temperature change, which causes additional error in the system. 3. Using a digital current detecting unit instead of an analog current detecting unit, and generates the initial current sampling information in a pulse width modulation (PWM) signal form. The disadvantage in this solution is that the PWM signal is modulated with an internal PWM circuit, which will cause phase delay and latency between the response of the current share information and the actual output current.

To sum up, the solutions to correct the current share information in the power supply system that use automatic master method to achieve current balancing still has the problems of efficiency, reliability, temperature effect, or phase latency, and therefore the redundant power supply system still requires improvement.

SUMMARY OF THE INVENTION

An objective of the present invention is to provide a power supply device with an improved current balancing mechanism.

To achieve the foregoing objective, the power supply device includes a power supply module, a current detecting unit, a comparator unit, a current mirror unit, and a voltage compensation unit. The power supply module is connected to an output end to output an output current. The current detecting unit is connected to the output end to detect the output current and generate a sample voltage. The current detecting unit has a sample voltage output end to output the sample voltage. The comparator unit has a positive input end, a negative input end, and a current share output end. The positive input end is connected to the sample voltage output end through a voltage divider unit, and the negative input end is connected to the current share output end through a negative feedback unit. The current mirror unit has a first end and a second end. The first end is connected to the sample voltage output end of the current detecting unit, and the second end is connected to the positive input end of the comparator unit. The voltage compensation unit is connected to the first end of the current mirror unit, and provides a compensation voltage to the first end of the current mirror unit.

The current detecting unit generates the sample voltage according to the output current, and the sample voltage is provided to the first end of the current mirror unit together with the compensation voltage. The sample voltage and the compensation voltage superpose at the first end of the current mirror unit to form a corrected sample voltage. The current drawn into the first end of the current mirror unit is reflected at the second end of the current mirror unit, and corrected sample voltage is at the second end of the current mirror unit, or the positive input end of the comparator unit, at a certain ratio according to the property of the voltage divider unit. Furthermore, the comparator unit amplifies the corrected sample voltage to a certain ratio according to the negative feedback unit, and outputs the current share voltage to the current share output end. The current share voltage is outputted to the current share bus as the comparing benchmark to the current share voltage(s) from other paralleled power supply device(s).

The present invention utilizes a current mirror circuit to present the corrected sample voltage to the positive end of the comparator unit at a certain ratio. The compensation voltage is modulated such that the current share voltage approaches the specified ideal current share voltage when the output of the power supply device is at heavy load. When the output of the power supply device is at a light load, the compensation voltage provides a lower compensation effect according to voltage superposition principle, such that the corrected sample voltage is closer to the sample voltage outputted by the current detecting unit, and therefore causing a lower offset when the sample voltage is low according to the low output current.

Furthermore, according to the property of the current mirror, the property of the current mirror will not be affected by temperature change, and the current flowing into the second end will equal the current drawn into the first end according to the voltage and the impedance at the first end regardless of the temperature. Therefore, unlike using BJT or MOSFET as variable resistor to correct the current share voltage, the corrected sample voltage input to the comparator unit and the current share voltage will not be influenced by temperature in the present invention.

Other objectives, advantages and novel features of the invention will become more apparent from the following detailed description when taken in conjunction with the accompanying drawings.

DETAILED DESCRIPTION OF THE INVENTION

Figure 1:
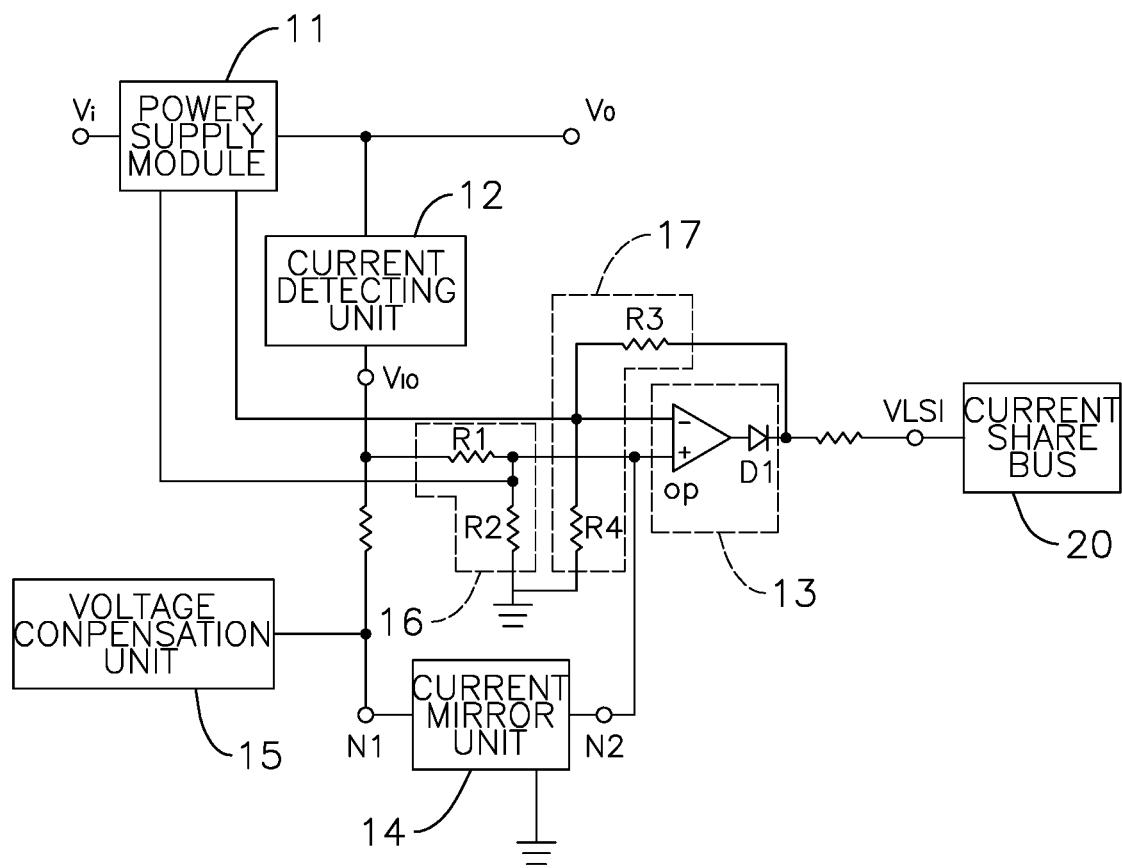
FIG. 1 is a circuit diagram of the present invention.

With reference to FIG. 1, the present invention provides a power supply device with an improved current balancing mechanism, including a power supply module 11, a current detecting unit 12, a comparator unit 13, a current mirror unit 14, and a voltage compensation unit 15. The power supply module 11 is connected to a load output end Vo to output an output current, and the load output end Vo is connected to a load output bus for parallel outputting with other power supply devices. The current detecting unit 12 is connected to the load output end Vo to detect the output current, generates a sample voltage accordingly, and outputs the sample voltage from a sample voltage output end $V_{IO}$. The comparator unit 13 has a positive input end +, a negative input end −, and a current share output end VLSI. The positive input end + is connected to the sample voltage output end $V_{IO}$ through a voltage divider unit 16, and the negative input end − is connected to the current share output end VLSI through a negative feedback unit. The current share output end VLSI is connected to a current share bus 20. The current share bus 20 is connected to multiple current share output ends VLSIs to receive the current share voltages of multiple power supply devices.

In the present embodiment, the voltage divider unit 16 includes a first resistor R1 and a second resistor R2. The first resistor R1 is connected between the sample voltage output end $V_{IO}$ and the positive input end + of the comparator unit 13, and the second resistor R2 is connected between the positive input end + and a ground end.

The comparator unit 13 outputs the current share voltage with the negative feedback control. The negative feedback unit includes a third resistor and a fourth resistor. The third resistor is connected between the negative input end − and the current share output end VLSI, and the fourth resistor is connected to the negative input end − and the ground end.

The current mirror unit 14 has a first end N1 and a second end N2. The first end N1 is connected to the sample voltage output end $V_{IO}$ of the current detecting unit 12, and the second end N2 is connected to the positive input end + of the comparator unit 13. The voltage compensation unit 15 is also connected to the first end N1 of the current mirror unit 14 to provide a compensation voltage.

Figure 2:
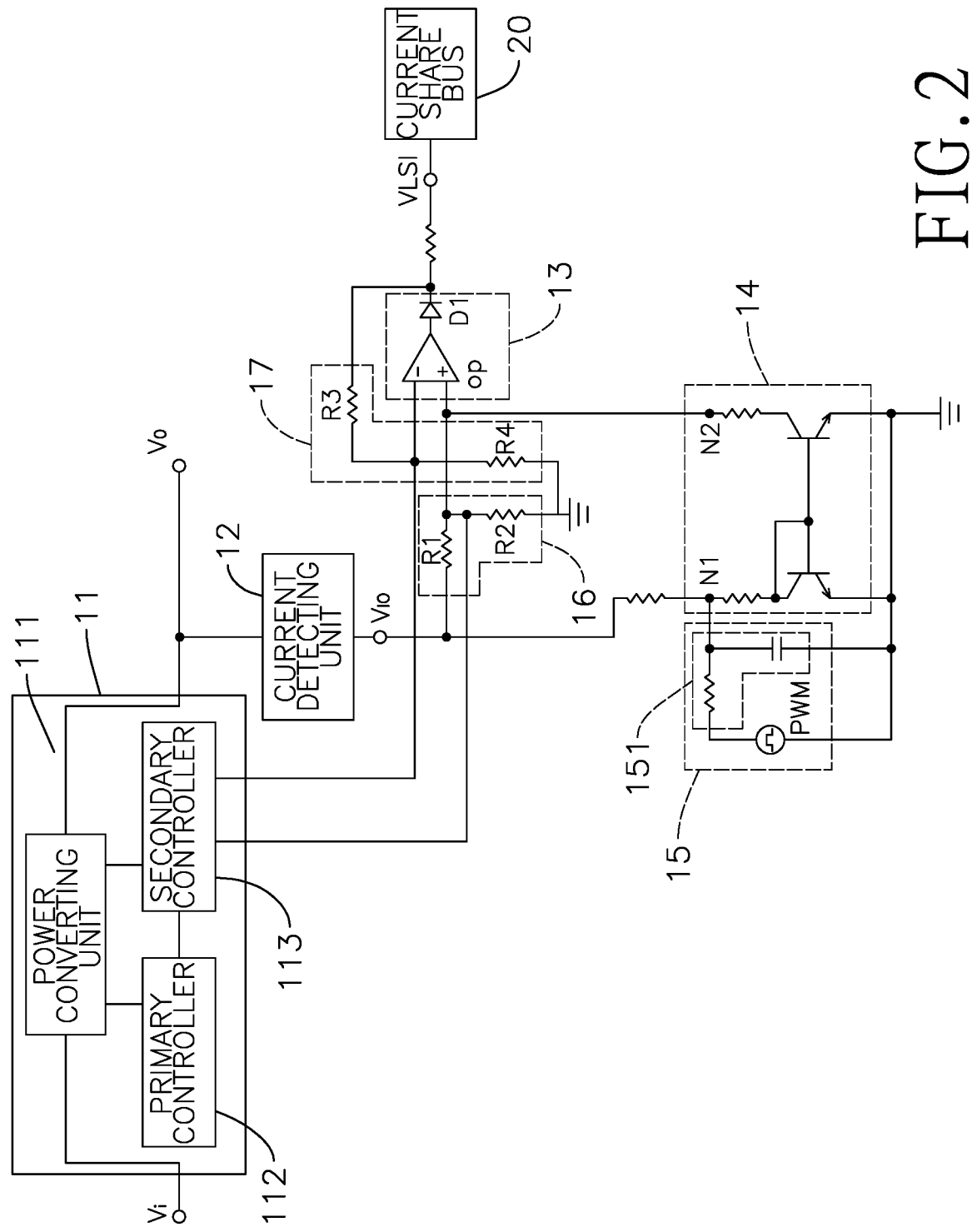
FIG. 2 is a circuit diagram of a first embodiment of the present invention.

With reference to FIG. 2, the compensation voltage is generated by putting a PWM signal through a filtering circuit. For example, the voltage compensation unit 15 is composed of a PWM input end PWM and a low pass filter 151. The PWM input end PWM receives a PWM signal, and the PWM signal is inputted to the low pass filter 151 to generate the compensation voltage. The PWM signal may come from a DSP in the power supply module 11, such as a primary controller 112 or a secondary controller 113 of the power supply module 11.

In the present embodiment, the PWM signal is used to generate the compensation voltage, and not as the detecting outcome of the output current. The compensation voltage is set to a fixed value at the early stage of system designing and regulating to ensure the current share voltage accurately responds to the output current at heavy output loading. Namely, when the power supply device is working, neither the compensation voltage nor the duty of PWM signal varies according to the time variant output current, and therefore no phase delay is introduced in the system.

With reference to FIG. 2, in the present embodiment, the comparator unit 13 includes an amplifier op and a diode D1, and the diode D1 is connected between an output end of the amplifier op and the current share output end VLSI.

Figure 3:
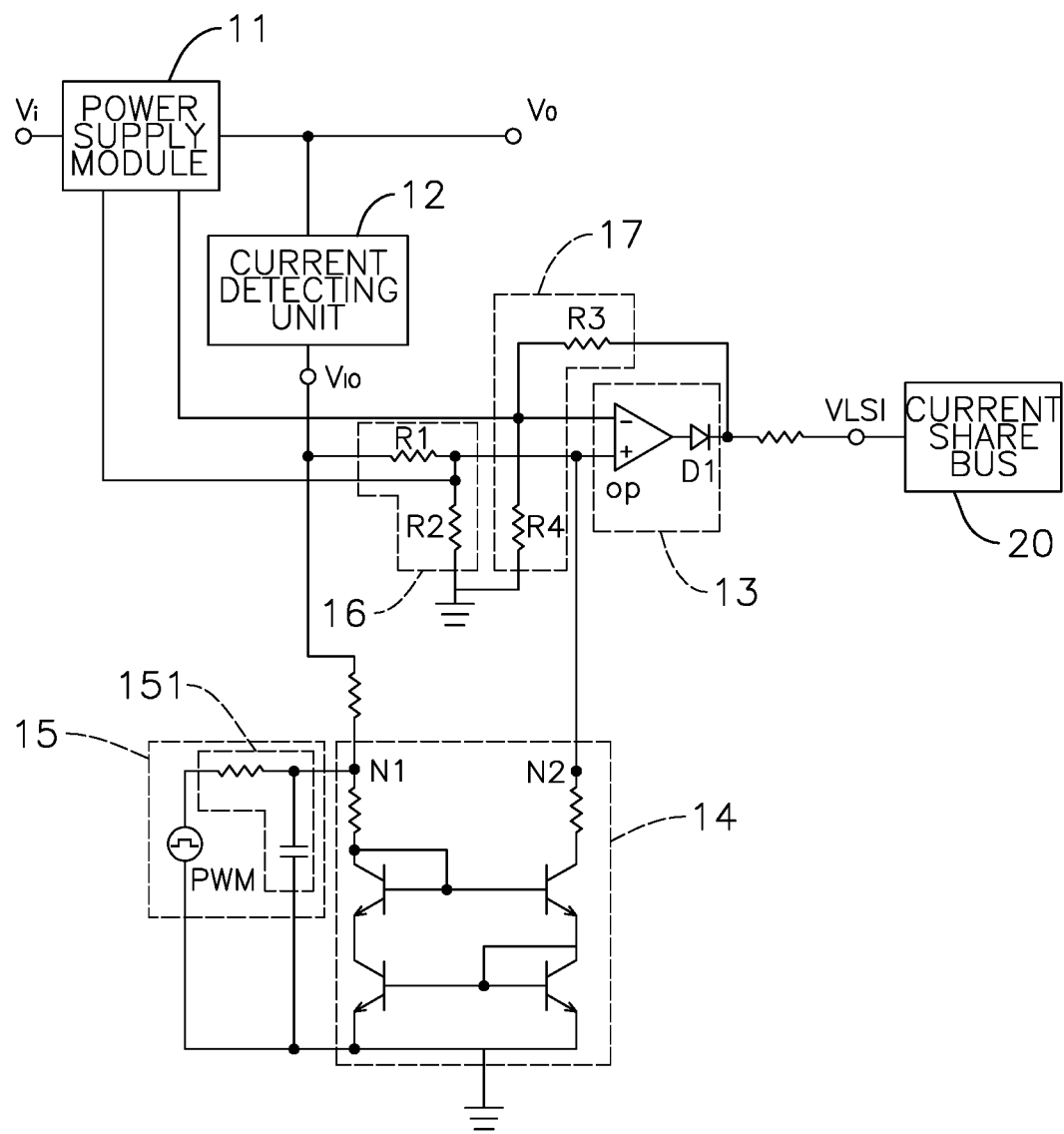
FIG. 3 is a circuit diagram of a second embodiment of the present invention.
Figure 4:
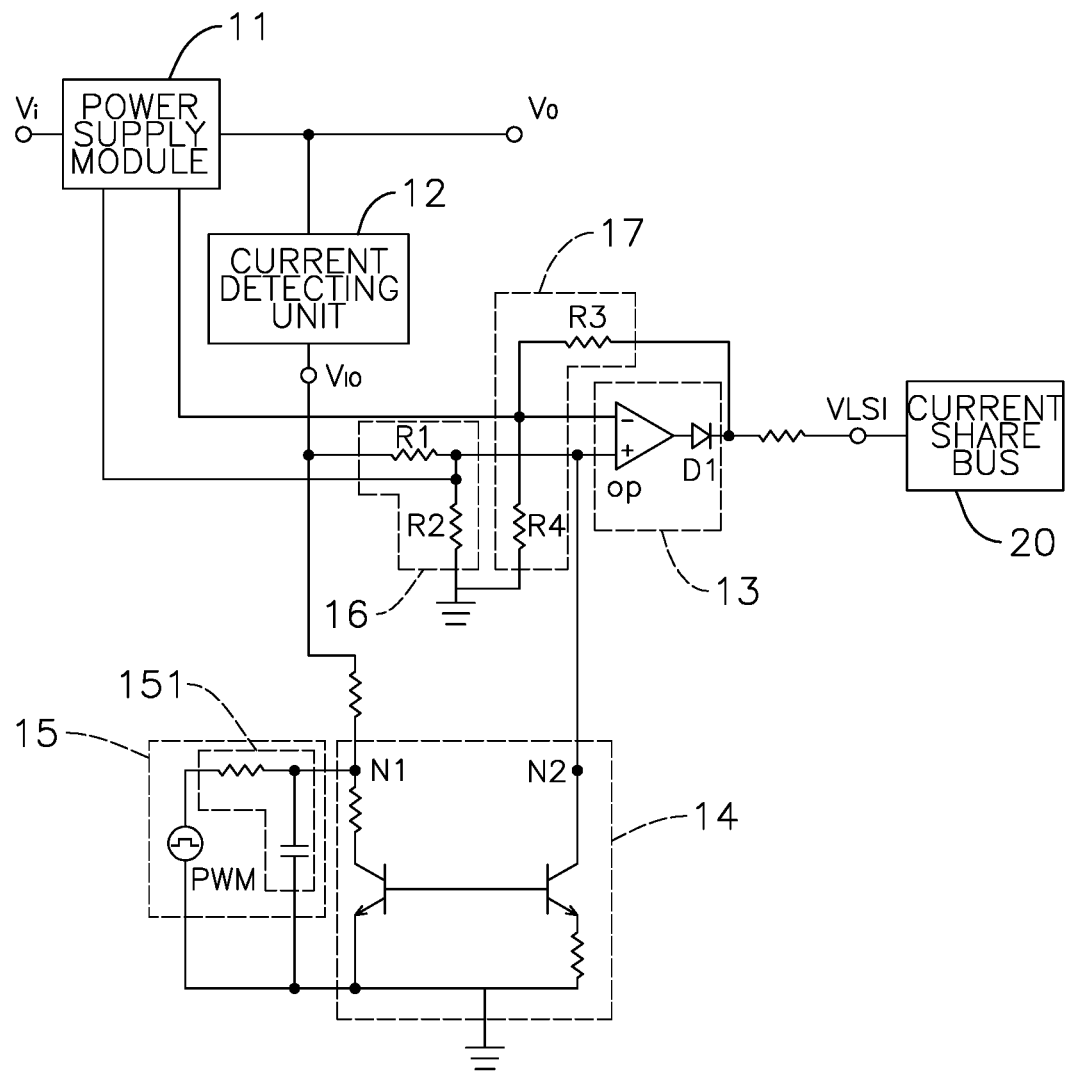
FIG. 4 is a circuit diagram of a third embodiment of the present invention.

With reference to FIG. 2, in an embodiment of the present embodiment, the current mirror unit 14 may be a standard current mirror. With reference to FIG. 3, in another embodiment, the current mirror unit 14 may be a Wilson Current Mirror. With reference to FIG. 4, in another embodiment, the current mirror unit 14 may be a Widlar Current Mirror.

Figure 5:
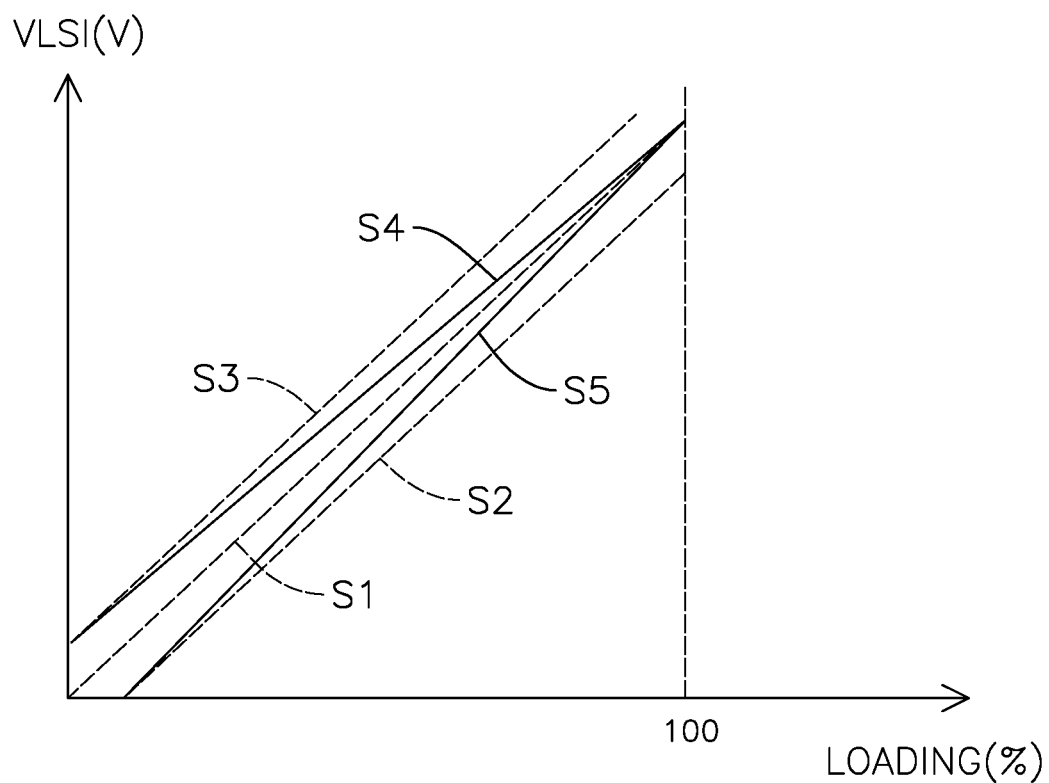
FIG. 5 is a relation diagram of the current share voltage in the loading of the power supply device of the present invention.
Figure 6:
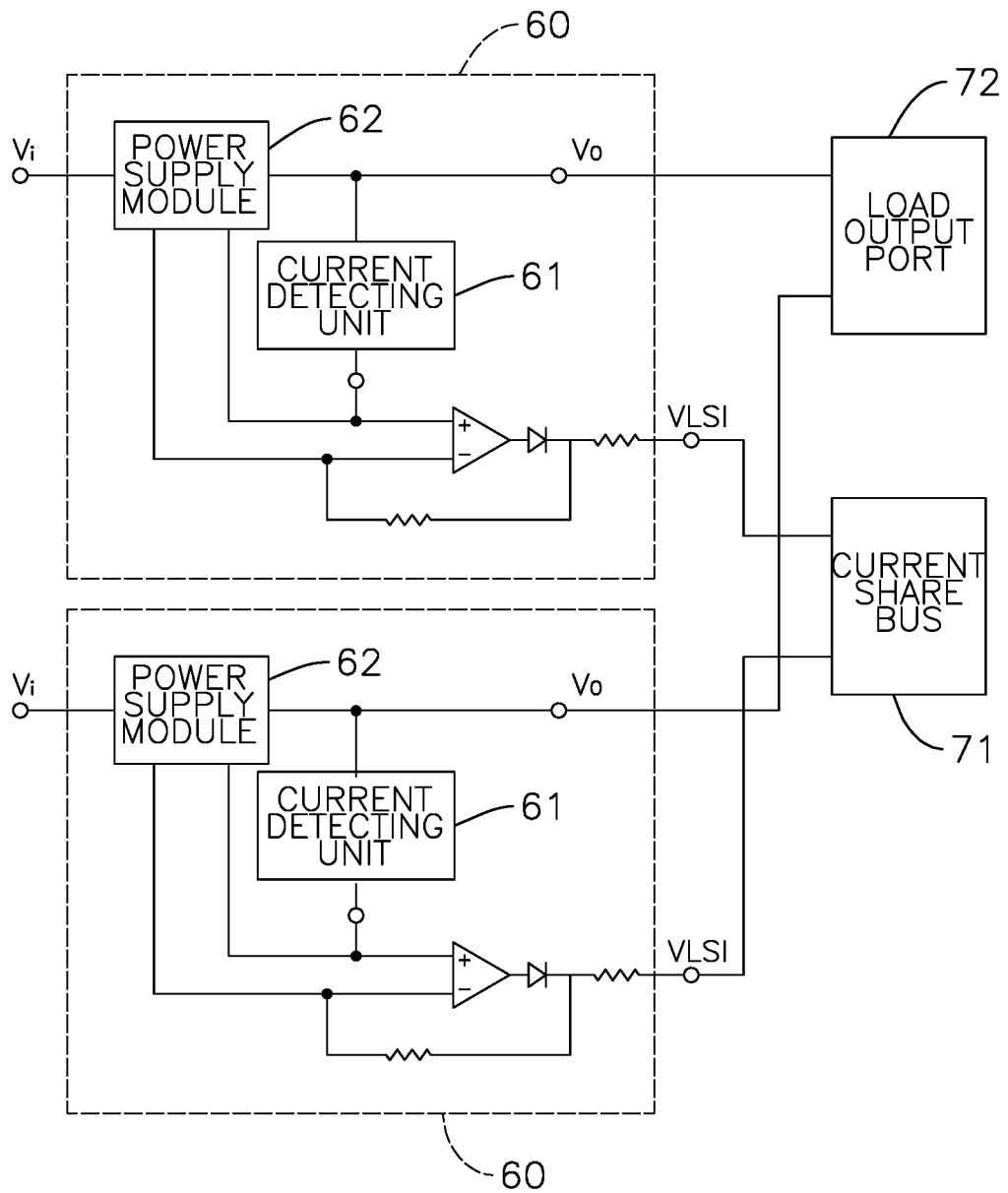
FIG. 6 is a circuit diagram of a conventional redundant power supply system with parallel current sharing output.

FIG. 5 is a representative diagram of the loading and the current share voltage of the present invention. Under an ideal situation, curve S1 shows that the current share voltage is proportional to the loading, or the output current. For example, the full load output of said power supply device is 8A (100%), and the current share voltage should by 4V; when the load is at 4A (50%), the current share voltage should by 2V. Curves S2 and S3 show the relationship of the current share voltage and the loading under the situation that error exists in the system. As shown, the curves S2 and S3 each have a positive or negative offset to the ideal curve S1. Finally, the curves S4 and S5 show the relationship of the current share voltage and the loading of the present invention, wherein the current share voltage is corrected from the biased value of S2 and S3 and approaches the ideal value at heavy output loading.

With reference to FIG. 2 again, the power supply module 11 may include a power converting unit 111, the primary controller 112, and the secondary controller 113. The secondary controller 113 is connected to the positive input end + and the negative input end − of the comparator unit 13 to receive the corrected sample voltage and the current share voltage. When the voltage at the negative input end − is higher than the voltage at the positive input end +, the secondary controller 113 cooperates with the primary controller 112 to control the power converting unit 111 to raise the output current.

The positive input end + of the comparator unit 13 receives the corrected sample voltage, and the comparator unit 13 generates the current share voltage with the negative feedback circuit, and the current share output end VLSI is connected to the current share bus 20. When the multiple power supply devices have perfect balanced output current, each power supply device also outputs the same current share voltage. When one of the power supply devices raises its output current above the regular balancing output current, its current share voltage also rises. The voltage on the current share bus 20 will be pulled up, and the negative feedback on the comparator unit 13 in the power supply device with lower output current will be compromised, since the voltage at the negative input end – will be pulled high along with the voltage at the current share output end VLSI, and the voltage at the negative input end – will be higher than the voltage at the positive input end +. According to the situation that the voltage at the negative input end – is higher than the voltage at the positive input end +, the secondary controller 113 determines that another power supply device connected to the current share bus 20 outputs a higher current, therefore controls the power supply module 11 to raise the output current until the negative feedback control of the comparator unit 13 retrieves balance, and the current balancing is therefore completed.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A power supply device with an improved current balancing mechanism, comprising:
    a power supply module, connected to an output end and outputting an output current;
    a current detecting unit, connected to the output end and detecting the output current to generate a sample voltage, and having a sample voltage output end to output the sample voltage;
    a comparator unit, having a positive input end, a negative input end, and a current share output end, wherein the positive input end is connected to the sample voltage output end through a voltage divider unit, and the negative input end is connected to the current share output end through a negative feedback unit;
    a current mirror unit, having a first end and a second end, wherein the first end is connected to the sample voltage output end of the current detecting unit, and the second end is connected to the positive input end of the comparator unit;
    a voltage compensation unit, connected to the first end of the current mirror unit to provide a compensation voltage.

2. The power supply device as claimed in claim 1, wherein the voltage compensation unit comprises:
    a pulse width signal input end, receiving a pulse width signal;
    a low pass filter, connecting to the pulse width signal input end to receive the pulse width signal, and performing a low pass filtering to the pulse width signal to generate the compensation voltage.

3. The power supply device as claimed in claim 1, wherein the comparator unit comprises:
    an amplifier,
    a diode, connected between an output end of the amplifier and the current share output end.

4. The power supply device as claimed in claim 1, wherein the current mirror unit is a Wilson Current Mirror circuit or a Widlar Current Mirror unit.

5. The power supply device as claimed in claim 1, wherein the power supply module comprises:
    a secondary control unit, connected to the positive input end and the negative input end of the comparator unit; wherein when a voltage of the negative input end is higher than a voltage of the positive input end, the secondary control unit controls the power supply module to raise the output current.

6. The power supply device as claimed in claim 1, wherein the voltage divider unit comprises:
    a first resistor, connected between the sampling voltage output end and the positive input end of the comparator unit;
    a second resistor, connected between the positive input end of the comparator unit and a ground end.

7. The power supply device as claimed in claim 1, wherein the negative feedback unit comprises:
    a third resistor, connected between the negative input end of the comparator unit and the current share output end; and
    a fourth resistor, connected between the negative input end and a ground end.

* * * * *